(12) United States Patent
Hong et al.

(10) Patent No.: US 10,941,919 B1
(45) Date of Patent: Mar. 9, 2021

(54) LIGHT BAR STRUCTURE

(71) Applicant: BenQ Materials Corporation, Taoyuan (TW)

(72) Inventors: Cyun-Tai Hong, Taoyuan (TW); Wei-Feng Xu, Taoyuan (TW); Chun-Nan Shen, Taoyuan (TW); Meng Chieh Wu, Taoyuan (TW); Guo-Long Gao, Taoyuan (TW)

(73) Assignee: BenQ Materials Corporation, Taoyuan (TW)

(*) Notice: Subject to any disclaimer, the term of this patent is extended or adjusted under 35 U.S.C. 154(b) by 0 days.

(21) Appl. No.: 16/819,255

(22) Filed: Mar. 16, 2020

(30) Foreign Application Priority Data

Oct. 2, 2019 (TW) .................................. 108135771

(51) Int. Cl.
*F21V 8/00* (2006.01)
*F21V 5/00* (2018.01)

(52) U.S. Cl.
CPC .............. *F21V 5/004* (2013.01); *G02B 6/003* (2013.01); *G02B 6/0051* (2013.01); *F21V 2200/20* (2015.01)

(58) Field of Classification Search
None
See application file for complete search history.

(56) References Cited

U.S. PATENT DOCUMENTS 8,496,341 B2 * 7/2013 Kawata ................. H05B 45/00
362/84

FOREIGN PATENT DOCUMENTS

| CN | 101685178 A | | 3/2010 | |
|---|---|---|---|---|
| KR | 2014108764 A | * | 9/2014 | ............... F21K 9/61 |
| TW | 201838812 A | | 11/2018 | |
| WO | WO 2013/002594 A1 | * | 1/2013 | ................ F21S 2/00 |

* cited by examiner

*Primary Examiner* — Sharon E Payne

(57) ABSTRACT

The present disclosure relates to a light bar structure, comprising: a circuit substrate, a spot light source matrix, and a light guide film. The light guide film comprises a plurality of strip-shaped micro lenses on the surface opposite to the spot light source matrix, and these strip-shaped micro lenses further comprise a plurality of gratings on the surfaces thereof. With the refraction and diffraction of the light guiding film, the diffusion angle of the light emitted from the spot light source matrix can be increased in one dimension, and the light bar structure can exhibit a uniform one-dimensional pattern.

12 Claims, 7 Drawing Sheets

LIGHT BAR STRUCTURE

CROSS-REFERENCE TO RELATED APPLICATION

This application claims the priority benefit of Taiwanese application serial No. 108135771 filed on Oct. 2, 2019, which is incorporated herein by reference.

BACKGROUND OF THE INVENTION

Field of the Invention

The present invention relates to a light bar structure which demonstrates as a uniform one-dimensional light source.

Description of Related Art

Light emitting diodes (LEDs) become more popular because of their properties of low heat dissipation and low power consumption, so they are widely used as light sources of lighting fixtures for illumination or indication. However, LED is a spot light source with high luminance, so a plurality of LEDs equipped with a light guide film and a diffusion film are necessary to provide a large area lighting with uniform and soft illumination.

Moreover, automotive lighting applications need not only basic lighting but also variable designs to precisely control emitting angles of the light sources. Therefore, there are some other problems need to be solved when LEDs are used as light sources. For example, when strip light sources are assembled to form lamps of various profiles, a LED is used as a side-emitting light source and often equipped with a columnar light guide strip to form an one-dimensional light bar, or a plurality of direct-type LED light sources are arranged to form an one-dimensional linear pattern and then the subsequent lamp structure design is performed. However, above-mentioned one-dimensional light bar formed by using a LED as a side-emitting light source and equipped with a columnar light guide strip, the light intensity of the side-emitting light source will unevenly decrease with the length of the columnar light guide strip, and the light injected into the columnar light guide strip can only be turned on or off as a whole at the same time, so it is impossible to generate dynamic light source patterns changing with timing control. Besides, the above-mentioned one-dimensional linear pattern formed by arranging a plurality of direct-type LED light sources is also difficult to form a uniform one-dimensional light source because local brightness of each LED light source is too high and the diffusion effect is affected by insufficient diffusion distance owing to the space limitation of the light fixture.

SUMMARY OF THE INVENTION

In order to solve the problems mentioned above, this present invention provides a light bar structure, comprising: a circuit substrate; a spot light source matrix formed on the circuit substrate, wherein the spot light source matrix is arranged along with a first direction to form an one-dimensional linear arrangement; and a light guide film arranged on the emitting side of the spot light source matrix, wherein the light guide film comprises a plurality of strip-shaped micro lenses along with a second direction perpendicular to the first direction on the surface opposite to the spot light source matrix, and the strip-shaped micro lenses comprises a plurality of gratings on the surfaces thereof along with the second direction.

Through the light bar structure of the present invention, the light emitted by the spot light source matrix can be diffused upward, so the light bar structure can present an one-dimensional linear pattern with uniform brightness, and the number of LEDs as the spot light source matrix can be decreased because of excellent diffusion effect, thereby the power can be saved and the distance between the light guide film and the spot light source matrix can be shorten which contributes to the miniaturization of the light fixture.

The light bar structure according to one embodiment of this invention, wherein the bottom width of each of the strip-shaped micro lenses along with the first direction is in the range of 15 µm to 1000 µm.

The light bar structure according to one embodiment of this invention, wherein the height between bottom and top of each of the strip-shaped micro lenses is in the range of 1 µm to 100 µm.

The light bar structure according to one embodiment of this invention, wherein the curvature radius of each of the strip-shaped micro lenses along with the first direction is in the range of 7.5 µm to 125000 µm.

The light bar structure according to one embodiment of this invention, wherein the surface topography of each of the strip-shaped micro lenses along with the second direction is determined by the sin function defined as $A \times \sin(2n\pi/T)$, wherein the amplitude of A is in the range of 0 to 45 µm, the cycle time of T is in the range of 5 µm to 500 µm, and the distance variable of n is in the range of 0 to T.

The light bar structure according to one embodiment of this invention, when the amplitude of A=0, each of the strip-shaped micro lenses is a flat columnar-shaped micro lens along with the second direction.

The light bar structure according to one embodiment of this invention, when the amplitude of A≠0, each of the strip-shaped micro lenses is an up-and-sown wave-shaped micro lens along with the second direction, and the surface topographies of any two adjacent strip-shaped micro lenses are different.

The light bar structure according to one embodiment of this invention, the width of each of the gratings is in the range of 0.25 µm to 1.5 µm.

The light bar structure according to one embodiment of this invention, the depth of each of the gratings is in the range of 0.1 µm to 1.5 µm.

The light bar structure according to one embodiment of this invention, the pitch of each of the gratings is in the range of 0.5 µm to 3 µm.

The light bar structure according to one embodiment of this invention, the distance between the spot light source matrix and the light guide film is in the range of 0.1 mm to 50 mm.

The light bar structure according to one embodiment of this invention, the refractive index of the light guide film is in the range of 1.4 to 1.65.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details. It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

Figure 1:
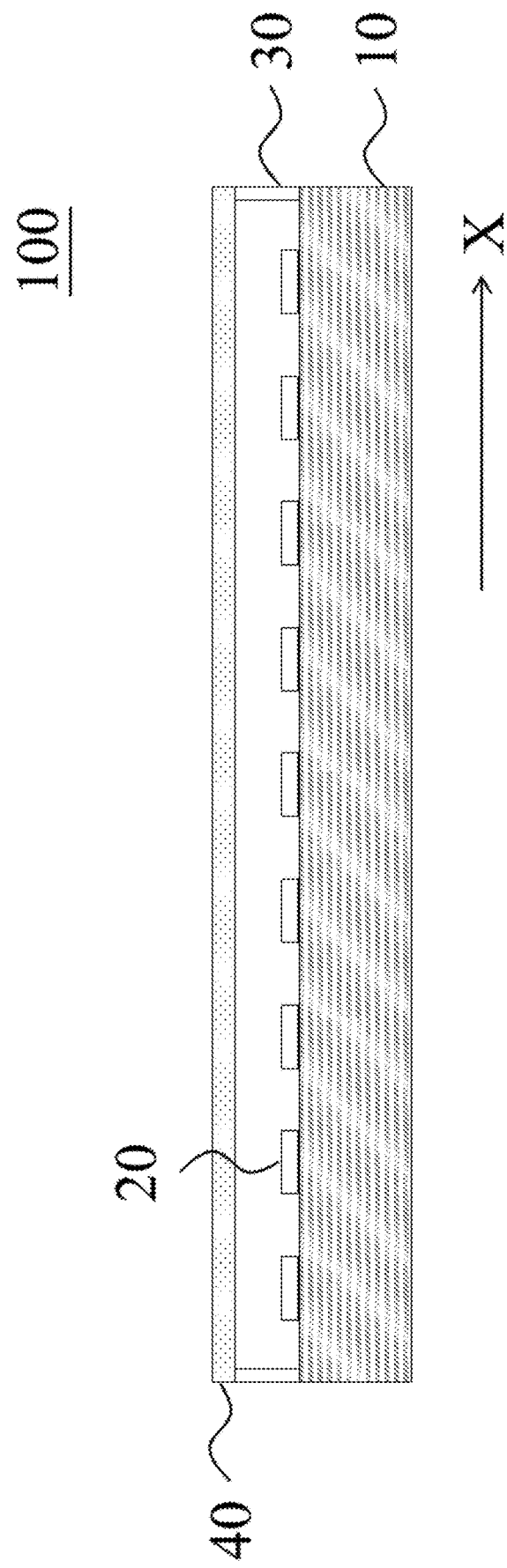
FIG. 1 illustrates a light bar structure according to this present invention.

FIG. 1 illustrates a light bar structure 100 according to this present invention. As shown in FIG. 1, the light bar structure 100 comprises a circuit substrate 10, a spot light source matrix 20 formed on the circuit substrate 10, and a light guide film 40. The spot light source matrix 20 comprises a plurality of light emitting diodes (LEDs) formed in a one-dimensional linear arrangement on the surface of the circuit substrate 10 along with the longitudinal axis (X-axis) thereof by means of conventional surface mounting technologies. The circuit substrate 10 can be a print-circuit substrate with a timing controller used to electrically interconnect and independently light up each LED of the spot light source matrix 20. The light guide film 40 is placed on the emitting side of the spot light source matrix 20, and the light emitted by the spot light source matrix 20 can be diffused by the distance maintained by a supporting frame 30 between the spot light source matrix 20 and the light guide film 40.

Figure 2:
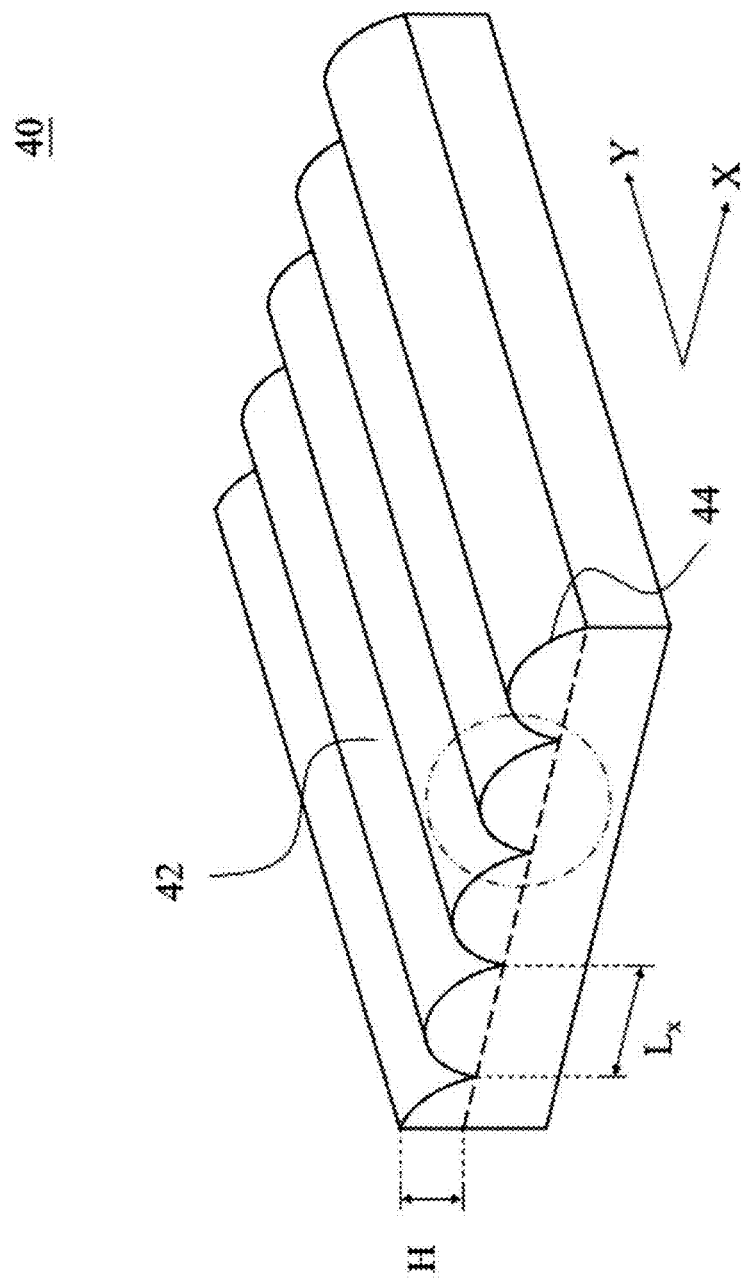
FIG. 2 illustrates a micro-structure of the surface of the light guide film according to one embodiment of this present invention.

As shown in FIG. 2, the surface of the light guide film 40 of the light bar structure 100 according to this invention opposite to the surface thereof facing to the spot light source matrix 20 comprises a plurality of strip-shaped micro lenses 42 along with Y-axis, wherein the bottom width $L_x$ of each of the strip-shaped micro lenses 42 along with X-axis is in the range of 15 μm to 1000 μm; the height H between bottom and top of each of the strip-shaped micro lenses 42 is in the range of 1 μm to 100 μm.

The curvature radius $R_x$ of the surface 44 of each of the strip-shaped micro lenses 42 of the light bar structure 100 of this present invention along with X-axis is in the range of 7.5 μm to 125000 μm which makes the light be refracted in X-axis when passing through the strip-shaped micro lenses 42 of the light bar structure 100.

The light bar structure 100 according to one embodiment of this invention, wherein the surface topography of each of the strip-shaped micro lenses 42 along with Y-axis is determined by the sin function defined as equation I: A×sin(2nπ/T), wherein A is the amplitude of the sin function, T is the cycle time of the sin function, n is the distance variable of the sin function, and a flat columnar-shaped micro lens along with Y-axis or an up-and-sown wave-shaped micro lens along with Y-axis can be generated by selecting a proper value of A in the range of 0 to 45 μm, selecting a proper value of T in the range of 5 μm to 500 μm, and selecting a proper value of n in the range of 0 to T.

When A of the equation I equals to 0, each of the strip-shaped micro lenses 42 of the light guide film 40 appears as a flat columnar-shaped along with Y-axis as shown in FIG. 2, thus the light passing through the strip-shaped micro lenses 42 of the light guide film 40 will not be prone to be refracted in the Y-axis, and the light will be refracted in X-axis. Therefore, the light bar structure will appear as an one-dimensional pattern along with X-axis.

Figure 3:
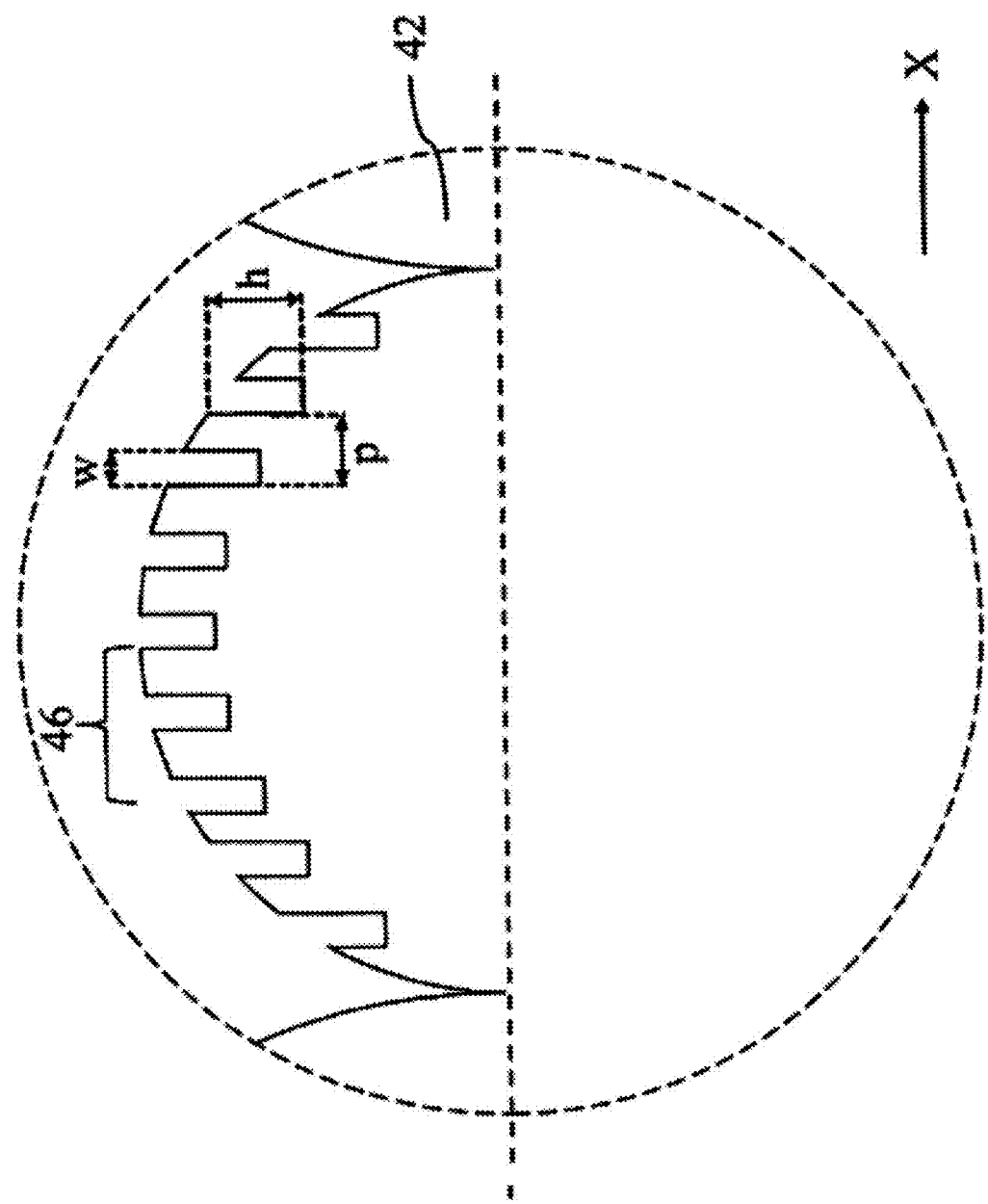
FIG. 3 illustrates a local-enlarged view of the surface of the light guide film according to one embodiment of this present invention.

There is a limit to increasing the light diffusion angles by changing the curvature radius of the lens owing to the limitation of total reflection. As shown in FIG. 3, the local-enlarged view of the surface of the light guide film according to one embodiment of this present invention is illustrated. The surface of the strip-shaped micro lenses 42 of the light guide film 40 further comprises a plurality of gratings 46 to make the diffraction of light happen when passing through the gratings 46 and enlarge diffusion angles of light. The gratings 46 comprises a plurality of uneven structures arranged along with Y-axis, which make the superficial refractive index of the strip-shaped micro lenses change periodically. When the light pass through the periodically changed surface of strip-shaped micro lenses, the diffraction of light will happen to overcome the limitation of total reflection, and enlarge the diffusion angles of light. Since the gratings 46 according to one embodiment of the present invention is arranged along with Y-axis direction, the diffracted light will diffuse toward the X-axis direction, so that the light passing through the strip-shaped micro lenses 42 can be diffused toward the X-axis direction at a large angle. In addition, the refraction effect of the strip-shaped micro lenses 42 can also compensate for the non-uniformity of the diffraction of light. Therefore, when the light or the spot light source matrix 20 passes through the light guide film 40, a uniform one-dimensional linear pattern with large diffusion angles can be generated.

The dimensions of the gratings 46 can be adjusted according to the wavelength of light emitted by the spot light source matrix 20. Preferably, the gratings 46 of one embodiment of this invention has a width w in the range of 0.25 μm to 1.5 μm, a depth d in the range of 0.1 μm to 1.5 μm, and a pitch p in the range of 0.5 μm to 3 μm.

Figure 4:
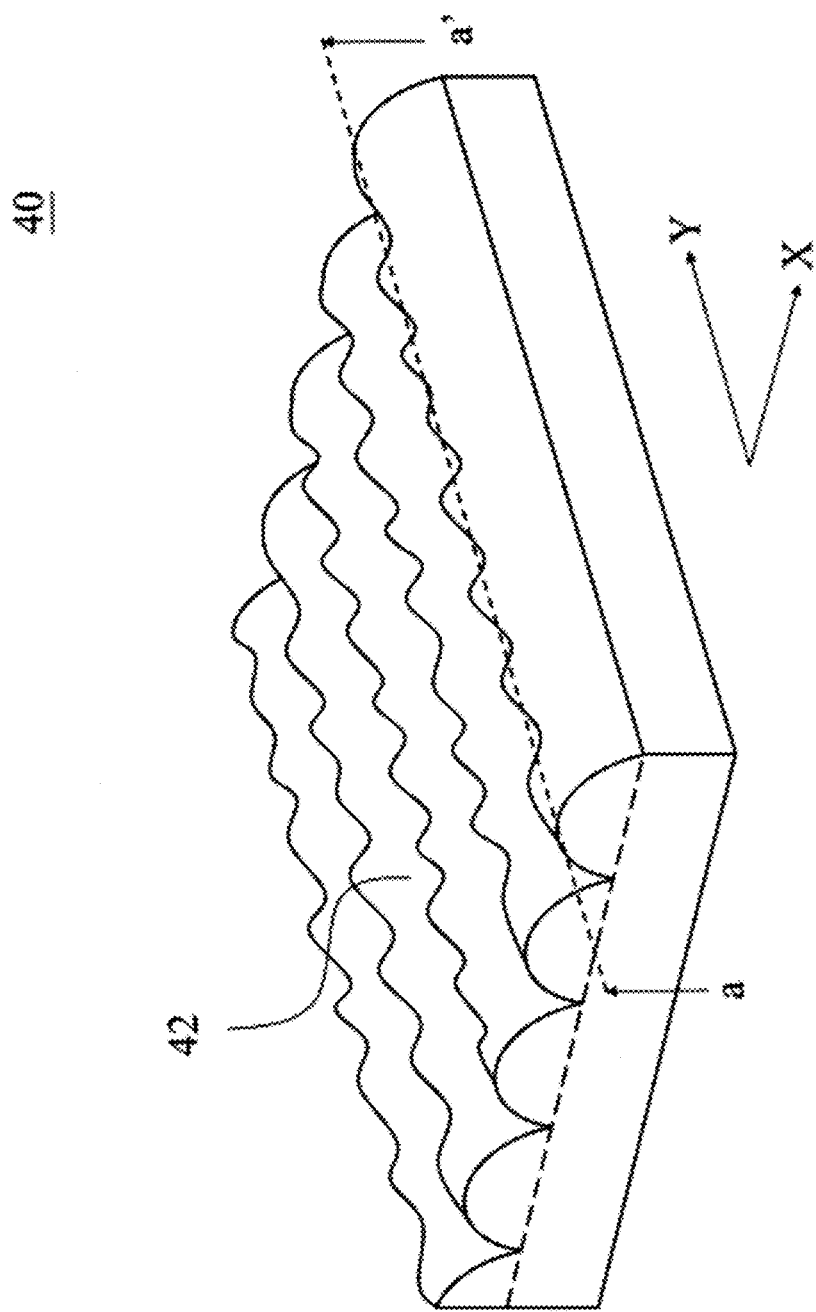
FIG. 4 illustrates a micro-structure of the surface of the light guide film according to another embodiment of this present invention.
Figure 5:
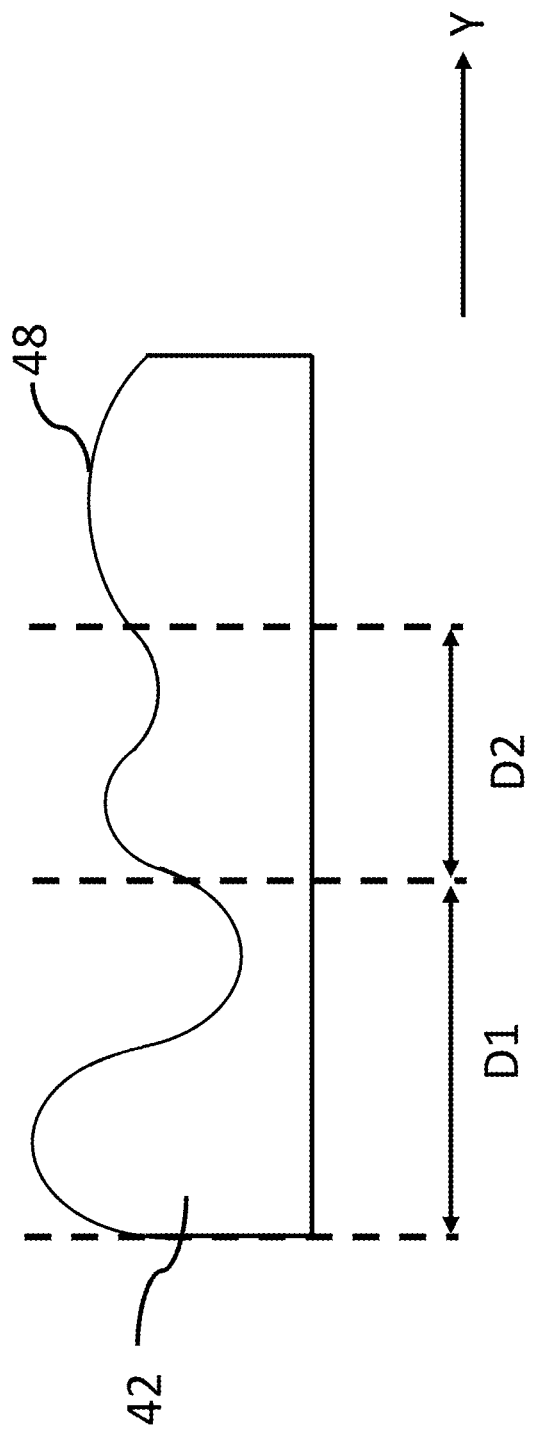
FIG. 5 illustrates a partial cross-sectional view of the surface of the light guide film according to another embodiment of this present invention.

When A of the equation I does not equal to 0, each of the strip-shaped micro lenses 42 of the light guide film 40 appears as an up-and-sown wave-shaped micro lens along with Y-axis as shown in FIG. 4. As shown in FIG. 5, a partial cross-sectional view along with the cross-sectional line a-a' of the surface of the light guide film 40 shown in FIG. 4 is illustrated, and the surface topography of the strip-shaped micro lenses 42 along with Y-axis appear as waves consisted of at least two random wave forms. The first wave form in the first section D1 can be defined by a first sin function as $A \times \sin(2n\pi/T)$, wherein $A=A1$, $T=T1$, and $n=0\sim T$, and the second wave form in the second section D2 can be defined by a second sin function as $A \times \sin(2n\pi/T)$, wherein $A=A2$, $T=T2$ and $n=0\sim T2$. The surface topographies of the strip-shaped micro lenses 42 are not limited to above-mentioned wave form, and any surface topography consisted of at least two random wave forms defined by the above-mentioned first sin function and the second sin function when the amplitude of A and the cycle time of T are random will be acceptable.

Wave profiles makes the strip-shaped micro lenses 42 form a plurality of similar convexes 48 along with Y-axis, and refractive diffusion of light occurs along with Y-axis when the light pass through the convexes 48 to form an one-dimensional pattern with a certain of width on the Y-axis. When the amplitude of A is increased and/or the cycle time of T is decreased, the curvature radius of each convex 48 will be decreased which results in the increase of diffusion effect increased on Y-axis, and the width of the one-dimensional pattern in the Y-axis direction increases accordingly. When the amplitude of A is decreased and/or the cycle time of T is increased, the curvature radius of each convex 48 will be increased which results in the decrease of diffusion effect increased on Y-axis, and the width of the one-dimensional pattern in the Y-axis direction also decreases accordingly.

As mentioned, the surface topography of the strip-shaped micro lenses 42 along with Y-axis are defined by two different sin functions, but the profiles of the not-shown strip-shaped micro lenses along with Y-axis according to another embodiment of this invention can also defined by a repeated single sin function. Moreover, the surface topographies of any two adjacent strip-shaped micro lenses 42 are different to enhance the uniform distribution of the one-dimensional pattern's luminance.

According to another embodiment of this present invention, in order to make the surface topography of the strip-shaped micro lenses 42 along with Y-axis appear as wave forms, the amplitude of A is greater than 0 μm and less than 45 μm, and the height of H of each of the strip-shaped micro lenses 42 is greater than two folds of the amplitude of A to control the pattern width on Y-axis is in the range of desired values. Preferably, the amplitude of A is in the range of 0.5 μm to 45 μm.

According to another embodiment of this invention, a plurality of gratings (not shown) are formed on the surface of each of the strip-shaped micro lenses along with Y-axis which make the light diffuse along with X-axis after diffraction.

The strip-shaped micro lenses 42 with gratings 46 can be formed by conventional embossing methods, for example but not limited to make a recessed master mold by a diamond knife or focus ion beam (FIB) in advance and emboss a light guide film 40 with a thickness of 20 μm to 500 μm by the recessed master mold thereafter to form the strip-shaped micro lenses 42 with a plurality of gratings 46. Suitable materials for the light guide film 40 can be a transparent resin of optical class with a refractive index in the range of 1.4 to 1.65 including but not limited to PMMA, PET, PC and TAC.

There is a certain of distance between the conventional diffusion film and the light source is necessary to provide a sufficient diffusion effect. However, the light guide film 40 of this present invention is used to diffuse the light by means of the mechanisms of refraction and diffraction, so this present invention can still provide an equal or better diffusion effect even the distance between the light guide film and the light source is small. Preferably, the distance between the light guide film 40 and the spot light source matrix 20 is in the range of 0.1 mm to 50 mm.

EMBODIMENT

The diffusion effect of the light bar structure according to this present invention will be explained by following embodiments and comparative examples.

Manufacture of a Light Bar

Embodiment 1

A light guide film with a thickness of 100 μm was provided, and the light guide film was embossed to form a plurality of strip-shaped micro lenses having a height (H) of 20 μm, a bottom width ($L_X$) along with X-axis of 80 μm, a curvature radius ($R_x$) of 50 μm, and a flat surface topography along with Y-axis. Further, a plurality of gratings with a depth (h) of 0.6 μm, a width (w) of 0.4 μm and a pitch (p) of 0.8 μm were formed on the surface of each of the strip-shaped micro lenses along with Y-axis.

Next, a circuit substrate was provided, and a spot light source matrix consisted of a plurality of light emitting diodes (LEDs) was formed on the circuit substrate. Then, the light guide film was placed 3 mm away from the spot light source matrix, and the surface of the light guide film with a plurality of strip-shaped micro lenses was disposed on the emitting side of the spot light source matrix.

Embodiments 2~3

The light bars of embodiments 2 and 3 were both manufactured as the method similar to that of Embodiment 1. The major differences between light bars according to Embodiments 2 and 3 are the profiles of the strip-shaped micro lenses along with Y-axis defined by a plurality of sin functions as $A \times \sin(2n\pi/T)$. The dimensions of the strip-shaped micro lenses according to the Embodiments 2 and 3 are summarized in Table 1 hereinafter.

Comparative Example 1

The light bars of the comparative example was manufactured as the method similar to that of Embodiment 1. The major difference between the light bars according to Embodiment 1 and the Comparative Example 1 is there is no grating formed on the surface of each of the strip-shaped micro lenses.

TABLE 1

| | Dimensions of the Strip-Shaped Micro Lense | | | Dimension of the Grating | | | Parameters of the Wave Form | |
|---|---|---|---|---|---|---|---|---|
| | H | $L_x$ | $R_x$ | h | P | w | A | T |
| | (μm) | (μm) | (μm) | (μm) | (μm) | (μm) | | |
| Embodiment 1 | 20 | 80 | 50 | 0.6 | 0.8 | 0.4 | NA | NA |
| Embodiment 2 | 20 | 80 | 50 | 0.6 | 0.8 | 0.4 | 3 | 46~80 |
| Embodiment 3 | 20 | 80 | 50 | 0.6 | 0.8 | 0.4 | 3 | 23~40 |
| Comparative Example 1 | 20 | 80 | 50 | NA | NA | NA | NA | NA |

Measurement of Light Intensity Distribution

The relationships of light intensity distributions and diffusion angles of the light bar structure of the Embodiment 1 and the Comparative Example 1 were plotted by perpendicularly injecting the light into the light guide films thereof and measuring the light intensities of the emitted light under different angles. The light intensity of the measuring angle of 0 degree is normalized set as 1, and the relative light intensities of other measuring angles can be calculated. The light intensity distributions of the light bar structure according to Embodiment 1 and the light bar structure according to the Comparative Example 1 are plotted and illustrated in FIG. 6.

Figure 6:
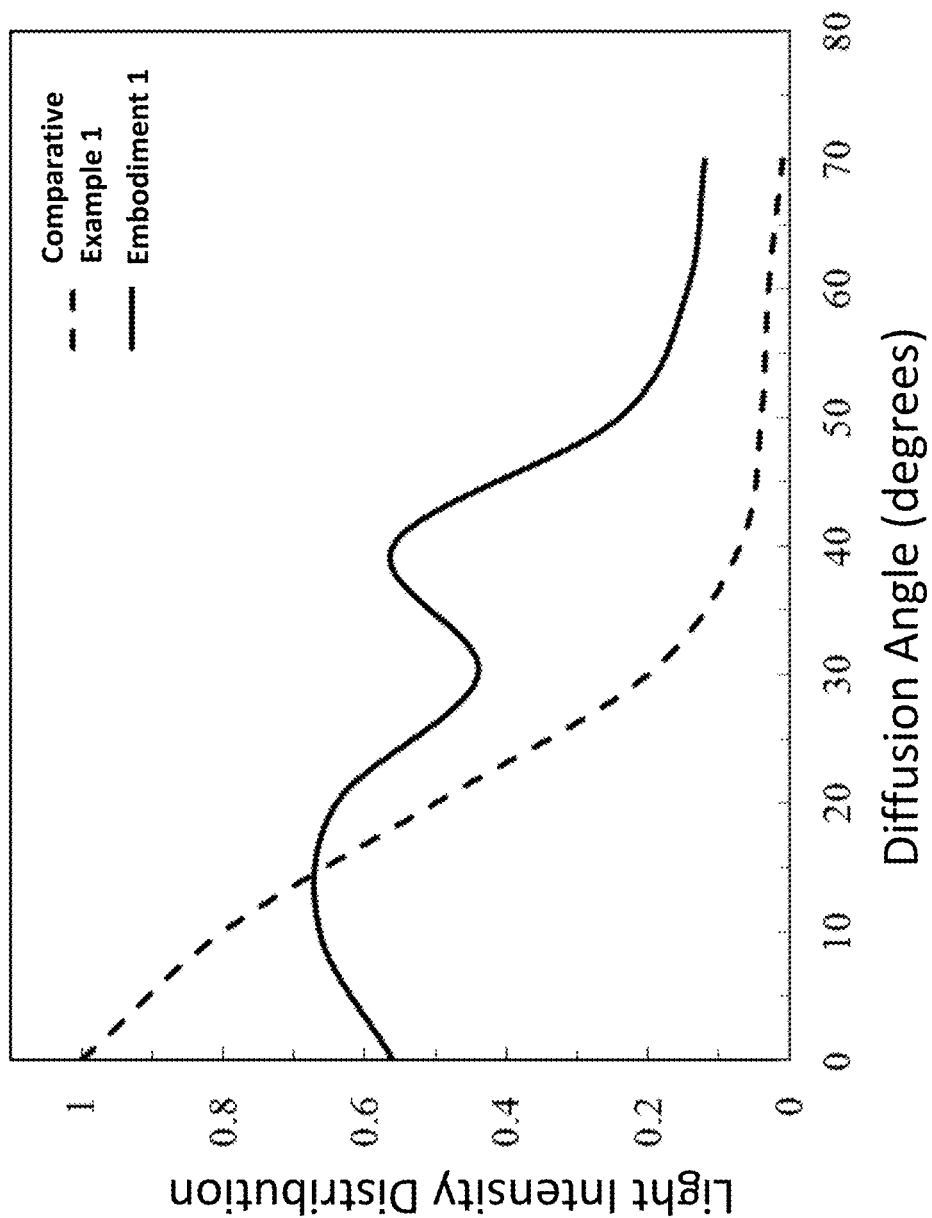
FIG. 6 illustrates the light intensity distribution of a light bar structure according to this present invention and a light bar structure according to a comparative example.

As shown in FIG. 6, when the light passes through the strip-shaped micro lenses with gratings according to the Embodiments 1, the one-dimensional diffusion angle of light can reach 40 degrees, and the luminance of the light is relatively uniform in the diffusion angles of 0 to 40 degrees; when the light passes through the strip-shaped micro lenses without gratings according to the Comparative Example 1, the one-dimensional light intensities will rapidly decrease with the increasing measuring angles. The results illustrated in FIG. 6 prove that the gratings on the strip-shaped micro lenses on the light guide film can enhance the diffusion angles and the luminance of light passing through the light guide film by refracting the light first and diffracting the light thereafter. The light guide films comprise strip-shaped micro lenses with gratings formed thereon according to the Embodiments 2 and 3 can also make the light diffuse in larger angles and provide with uniform luminance.

Figure 7:
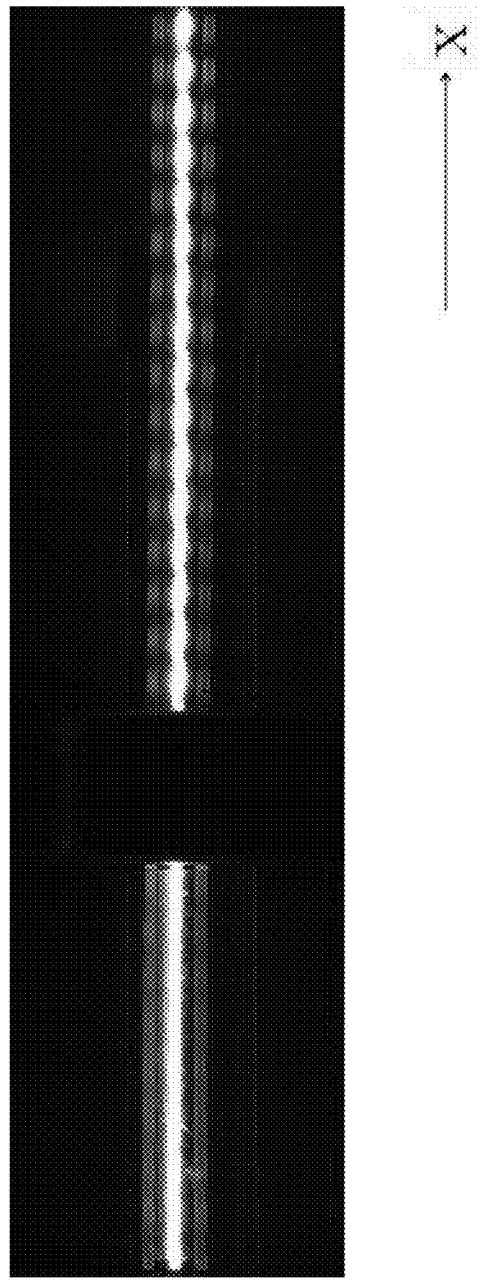
FIG. 7 are images of a lit-up light bar structure according to this present invention and a lit-up light bar structure according to a comparative example.

Furthermore, the left image of FIG. 7 shows a light bar structure according to the Embodiment 1 of this present invention lit up in a dark environment, and the right image of FIG. 7 shows a light bar structure according to the Comparative Example 1 lit up in a dark environment. As shown in the left image of FIG. 7, the patterns of the spot light sources according to the Embodiment 1 of this present invention are linear and continuous, and the luminance thereof is uniform. As shown in the right image of FIG. 7, the patterns of the spot light sources of the Comparative Example 1 are irregular and discontinuous owing to the dark spots existing in any two adjacent spot light sources.

As mentioned above, a plurality of strip-shaped micro lenses are formed on the surface of the light guide film of the light bar structure according to this present invention to make the light refract and diffuse along with one-dimension, and further make diffraction of the diffusing light happen by means of the plurality of gratings on the surface of each of the strip-shaped micro lenses. Accordingly, the light can be uniformly diffused along with the same dimension and provide the lighting fixture with a uniform one-dimensional linear pattern.

The light guide film of this present invention exists a significant one-dimensional diffusion, thereby the problem of insufficient distance still can be compensated by the high diffusion property of the light guide film even the distance between the light guide film and the spot light source matrix is decreased. Therefore, the light bar structure according to this present invention can be used in the lighting fixture with a limited space.

Moreover, the light guide film of this present invention can provide excellent diffusion, and therefore it also proves the advantages of power saving owing to the numbers of LEDs for the spot light source matrix can be decreased.

While the invention has been described by way of example(s) and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light bar structure, comprising:
   a circuit substrate;
   a spot light source matrix formed on the circuit substrate, wherein the spot light source matrix is arranged along with a first direction to form an one-dimensional linear arrangement; and
   a light guide film arranged on the emitting side of the spot light source matrix, wherein the light guide film comprises a plurality of strip-shaped micro lenses along with a second direction perpendicular to the first direction on the surface opposite to the spot light source matrix, and the strip-shaped micro lenses comprises a plurality of gratings on the surfaces thereof along with the second direction.

2. The light bar structure according to claim 1, wherein the bottom width of each of the strip-shaped micro lenses along with the first direction is in the range of 15 μm to 1000 μm.

3. The light bar structure according to claim 1, wherein the height between bottom and top of each of the strip-shaped micro lenses is in the range of 1 μm to 100 μm.

4. The light bar structure according to claim 1, wherein the curvature radius of each of the strip-shaped micro lenses along with the first direction is in the range of 7.5 μm to 125000 μm.

5. The light bar structure according to claim 1, wherein the surface topography of each of the strip-shaped micro lenses along with the second direction is determined by the sin function defined as $A \times \sin(2n\pi/T)$, wherein the amplitude of A is in the range of 0 to 45 μm, the cycle time of T is in the range of 5 μm to 500 μm, and the distance variable of n is in the range of 0 to T.

6. The light bar structure according to claim 5, when the amplitude of A=0, each of the strip-shaped micro lenses is a flat columnar-shaped micro lens along with the second direction.

7. The light bar structure according to claim 5, when the amplitude of A≠0, each of the strip-shaped micro lenses is an up-and-sown wave-shaped micro lens along with the second direction, and the surface topographies of any two adjacent strip-shaped micro lenses are different.

8. The light bar structure according to claim 1, the width of each of the gratings is in the range of 0.25 μm to 1.5 μm.

9. The light bar structure according to claim 1, the depth of each of the gratings is in the range of 0.1 μm to 1.5 μm.

10. The light bar structure according to claim 1, the pitch of each of the gratings is in the range of 0.5 μm to 3 μm.

11. The light bar structure according to claim 1, the distance between the spot light source matrix and the light guide film is in the range of 0.1 mm to 50 mm.

12. The light bar structure according to claim 1, the refractive index of the light guide film is in the range of 1.4 to 1.65.

* * * * *